UNITED STATES PATENT OFFICE.

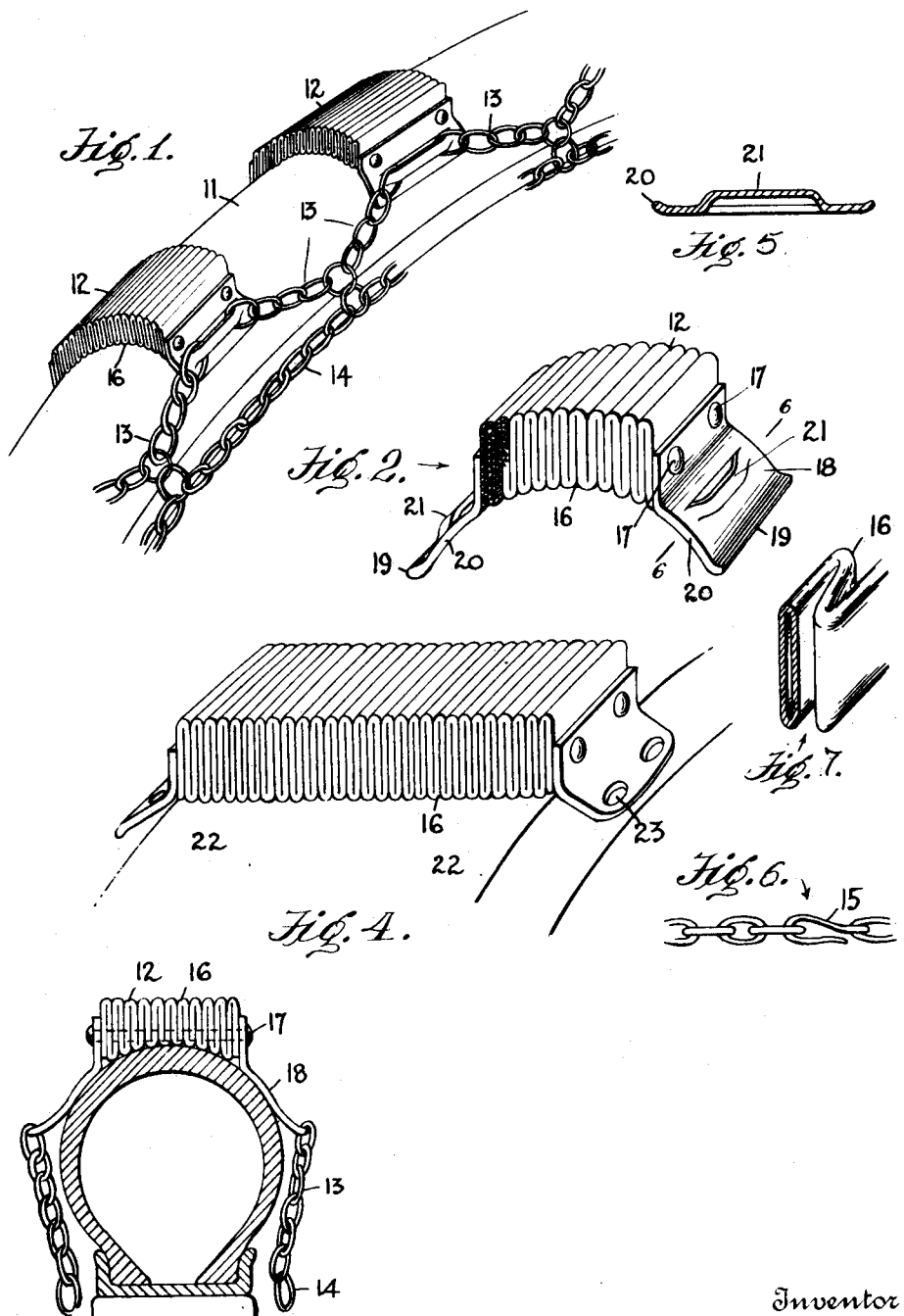

EMIL ERIK, OF OSSINING, NEW YORK, ASSIGNOR OF ONE-HALF TO JOHN FETTO, OF OSSINING, NEW YORK.

TRACTION-TREAD.

1,379,336.     Specification of Letters Patent.     Patented May 24, 1921.

Application filed October 15, 1920. Serial No. 417,261.

*To all whom it may concern:*

Be it known that I, EMIL ERIK, a citizen of the United States, residing at 354 Hunter street, Ossining, New York, have invented certain new and useful Improvements in Traction-Treads, of which the following is a specification.

This invention relates to auxiliary or non-slip treads for vehicle tires and its object is to devise such a removable tread which will give all the traction needed and yet which will not injure the road.

The invention then consists essentially in fabric bent back and forth upon itself to form a tread and the folds are secured together so that the bends or folds are presented to the road, and suitable end or side devices may be provided for the fabric whereby it can be removably secured to a vehicle tire with the tread preferably extending across the tread of the tire and the folds of the fabric running parallel with the tire tread.

I have illustrated an embodiment of my invention as required by law, which embodiment is the best of which I am at present informed so it should be understood that it is described in an illustrative sense and not a limiting one.

In the accompanying drawings,

Figure 1 is a perspective view of a portion of a pneumatic tire with my tread in place on it;

Fig. 2 shows a perspective view of one unit of my tread devices;

Fig. 3 is a transverse section through a pneumatic tire having my tread applied thereto;

Fig. 4 shows my tread modified to fit a solid tire;

Fig. 5 is a cross section taken along the line 6—6 in Fig. 2;

Fig. 6 shows a detail and

Fig. 7 shows that the fabric used is preferably doubled and endless.

In the drawings, the numeral 11 indicates a pneumatic tire to which are applied tread units 12 secured together by chains 13 and they in turn are secured to chains 14 holding the linked treads to the tire. These chains 14 are removable from the tire by means of a hook 15.

The units 12 are composed of fabric 16 doubled and endless, as shown in Fig. 7, (preferably a flattened hose) bent back and forth upon itself and held in by bolts 17 passing through the fabric 16 and secured to metal end pieces 18 curved into the shape shown so that they will not harm the tire.

Their bottom edges 19 and side edges 20 curve upwardly for this same purpose, and a link 21 is raised in the end pieces to which may be secured the chains 13. The top of the fabric in the units may take the same transverse curvature as the tire tread as shown in Fig. 1 or its top may be flat as shown in Fig. 3.

For solid tires, the form shown in Fig. 4 may be used. 22 indicates the solid rubber tread on a wheel. In Fig. 4, the unit is composed of the previously described fabric 16, bolts 17, and side pieces 18, except that the unit is long enough to bridge the solid tire and either the raised links 21 may be provided on the end pieces for engagement by the chains 13, or eyes 23 may be provided.

What I claim is:

1. A non skid device comprising a series of independent tread elements each of which consists of metal end pieces partially curved to engage a portion of the tire and an upstanding portion, a length of annular flattened fabric folded upon itself held between the upstanding portions of said metal end pieces, a bolt passing through said end pieces and also through each fold of the fabric, and means for securing said tread to said tire.

2. The device of claim 1, the folds of said fabric being of decreasing height from the upstanding portions of the end pieces toward the center of the tread.

In testimony whereof I have affixed my signature to this specification.

EMIL ERIK.